US010009748B2

(12) United States Patent
Seo et al.

(10) Patent No.: US 10,009,748 B2
(45) Date of Patent: Jun. 26, 2018

(54) METHOD FOR MANAGING UPLINK TRANSMISSION RESOURCE IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 13 days.

(21) Appl. No.: 14/913,949

(22) PCT Filed: Oct. 10, 2014

(86) PCT No.: PCT/KR2014/009524
§ 371 (c)(1),
(2) Date: Feb. 23, 2016

(87) PCT Pub. No.: WO2015/053584
PCT Pub. Date: Apr. 16, 2015

(65) Prior Publication Data
US 2016/0255489 A1 Sep. 1, 2016

Related U.S. Application Data

(60) Provisional application No. 61/889,038, filed on Oct. 10, 2013.

(51) Int. Cl.
*H04W 4/00* (2009.01)
*H04W 8/00* (2009.01)
(Continued)

(52) U.S. Cl.
CPC .......... *H04W 8/005* (2013.01); *H04B 7/2656* (2013.01); *H04L 5/005* (2013.01);
(Continued)

(58) Field of Classification Search
CPC ... H04W 72/00; H04W 8/005; H04W 76/023; H04L 5/005; H04L 5/0066
(Continued)

(56) References Cited

U.S. PATENT DOCUMENTS

2012/0044878 A1* 2/2012 Ratasuk ............ H04W 74/0866
370/329
2012/0127964 A1* 5/2012 Turtinen ........... H04W 56/0045
370/336
(Continued)

FOREIGN PATENT DOCUMENTS

CN 102232308 A 11/2011
CN 102648593 A 8/2012
KR 10-2012-0116271 A 10/2012

OTHER PUBLICATIONS

HTC, "Discussion on TDD UL-DL Reconfiguration in TDD eIMTA Systems," 3GPP TSG-RAN WG1 Meeting #74, R1-133252, Barcelona, Spain, Aug. 19-23, 2013, pp. 1-5.
(Continued)

*Primary Examiner* — Chi H Pham
*Assistant Examiner* — Alexander O Boakye
(74) *Attorney, Agent, or Firm* — Birch, Stewart, Kolasch & Birch, LLP

(57) ABSTRACT

In the present application, a method of transmitting and receiving a signal by a terminal in a wireless communication system is disclosed. Specifically, the method comprises the steps of: receiving, from a network, information about a subframe which is designated for first use application, and information about a subframe in which use dedicated application is disabled; receiving, from the network, information about a use application change subframe which indicates the subframe which will change the first use application to a second use application; and transmitting and receiving a signal to and from the network or other terminals, according to the information about the use application change subframe, wherein if a specific subframe for transmission and reception of the signal belongs to the subframe in which a use dedicated application is disabled, the terminal transmits and receives a signal to and from the network according to the first use application in the specific resource.

14 Claims, 9 Drawing Sheets

(51) Int. Cl.

| | | |
|---|---|---|
| *H04B 7/26* | (2006.01) | |
| *H04W 72/00* | (2009.01) | |
| *H04W 74/08* | (2009.01) | |
| *H04W 76/02* | (2009.01) | |
| *H04L 5/00* | (2006.01) | |
| *H04L 5/14* | (2006.01) | |

(52) U.S. Cl.
CPC ........... *H04L 5/0066* (2013.01); *H04W 72/00* (2013.01); *H04W 74/0833* (2013.01); *H04W 76/023* (2013.01); *H04L 5/1469* (2013.01)

(58) Field of Classification Search
USPC .......................................................... 370/329
See application file for complete search history.

(56) References Cited

U.S. PATENT DOCUMENTS

| | | |
|---|---|---|
| 2012/0263057 A1 | 10/2012 | Choi et al. |
| 2012/0287877 A1* | 11/2012 | Han .................... H04W 74/002 370/329 |
| 2013/0051277 A1 | 2/2013 | Hakola et al. |
| 2013/0157670 A1 | 6/2013 | Koskela et al. |

OTHER PUBLICATIONS

Mediatek Inc., Discussion on Differences in Behaviors between Fixed and Flexible Subframes, 3GPP TSG-RAN WG1 Meeting #73, R1-132274, Fukuoka, Japan, May 20-24, 2013, pp. 1-6.

Panasonic, "Signalling for flexible subframes and determination of their usage," 3GPP TSG-RAN WG1 Meeting 73, R1-132137, Fukuoka, Japan, May 20-24, 2013, pp. 1-5.

Renesas Mobile Europe Ltd., "Discussion on enhancements for Dynamic TDD UL-DL Configuration," 3GPP TSG-RAN WG1 Meeting #69, R1-122363, Prague, Czech Republic, May 21-25, 2012, 4 pages.

Intel Corporation, "Resource allocation for D2D discovery," 3GPP TSG-RAN2 Meeting #83bis, R2-133512, Ljubljana, Slovenia, Oct. 7-11, 2013, (downloaded by EPO on Sep. 28, 2013), XP050719226, pp. 1-4.

Nokia et al., "D2D Discovery Signal," 3GPP TSG-RAN WG1 Meeting #74bis, R1-134538, Guangzhou, China, Oct. 7-11, 2013, (downloaded by EPO on Sep. 28, 2013), XP050717641, 7 pages.

LG Electronics, "Resource Allocation and UE Behavior for Discovery Type 1 and Type 2", 3GPP TSG RAN WG1 Meeting #74, R1-133388, Barcelona, Spain, Aug. 19-23, 2013, pp. 1-6.

* cited by examiner (a) Control-Plane Protocol Stack (b) User-Plane Protocol Stack

METHOD FOR MANAGING UPLINK TRANSMISSION RESOURCE IN WIRELESS COMMUNICATION SYSTEM, AND APPARATUS THEREFOR

CROSS REFERENCE TO RELATED APPLICATIONS

This application is the National Phase of PCT International Application No. PCT/KR2014/009524, filed on Oct. 10, 2014, which claims priority under 35 U.S.C. 119(e) to U.S. Provisional Application No. 61/889,038, filed on Oct. 10, 2013, all of which are hereby expressly incorporated by reference into the present application.

TECHNICAL FIELD

The present invention relates to a wireless communication system, and more particularly, to a method of managing an uplink transmission resource in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

In the following, the present invention proposes a method of managing an uplink transmission resource in a wireless communication system and an apparatus therefor based on the aforementioned discussion.

Technical Solution

To achieve these and other advantages and in accordance with the purpose of the present invention, as embodied and broadly described, according to one embodiment, a method of transmitting and receiving a signal, which is transmitted and received by a user equipment in a wireless communication system, includes the steps of receiving information on a subframe designated as a first usage and information on a subframe of which a dedicated usage is disabled from a network, receiving information on a usage change subframe, which indicates a subframe for changing the first usage into a second usage, from the network and transceiving a signal with the network or a different user equipment according to the information on the usage change subframe. In this case, if a specific subframe in which the signal is to be transceived is included in the subframe of which the dedicated usage is disabled, a signal is transceived with the network according to the first usage in the specific resource.

To further achieve these and other advantages and in accordance with the purpose of the present invention, according to a different embodiment, a user equipment in a wireless communication system includes a wireless communication module configured to transceive a signal with a network or a counterpart user equipment and a processor configured to process the signal, the processor configured to control the wireless communication module to receive information on a subframe designated as a first usage and information on a subframe of which a dedicated usage is disabled from the network, configured to receive information on a usage change subframe, which indicates a subframe for changing the first usage into a second usage, from the network, configured to transceive a signal with the network or a different user equipment according to the information on the usage change subframe, the processor, if a specific subframe in which the signal is to be transceived is included in the subframe of which the dedicated usage is disabled, configured to control the wireless communication module to transceive a signal with the network according to the first usage in the specific resource.

In the above mentioned embodiments, the first usage may correspond to an uplink transmission usage for transmitting a signal to the network and the second usage may correspond to a downlink reception usage for receiving a signal from the network. Or, the first usage may correspond to an uplink transmission usage for transmitting a signal to the network and the second usage may correspond to a direct communication usage between user equipments for transmitting a signal to the different user equipment.

Preferably, the information on the subframe of which the dedicated usage is disabled may correspond to information on an uplink subframe in which a PRACH (physical random access channel) is to be transmitted and/or information on an uplink subframe in which a sounding reference signal is to be transmitted.

Advantageous Effects

According to embodiments of the present invention, it is able to efficiently and stably manage an uplink transmission resource in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Mode for Invention

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
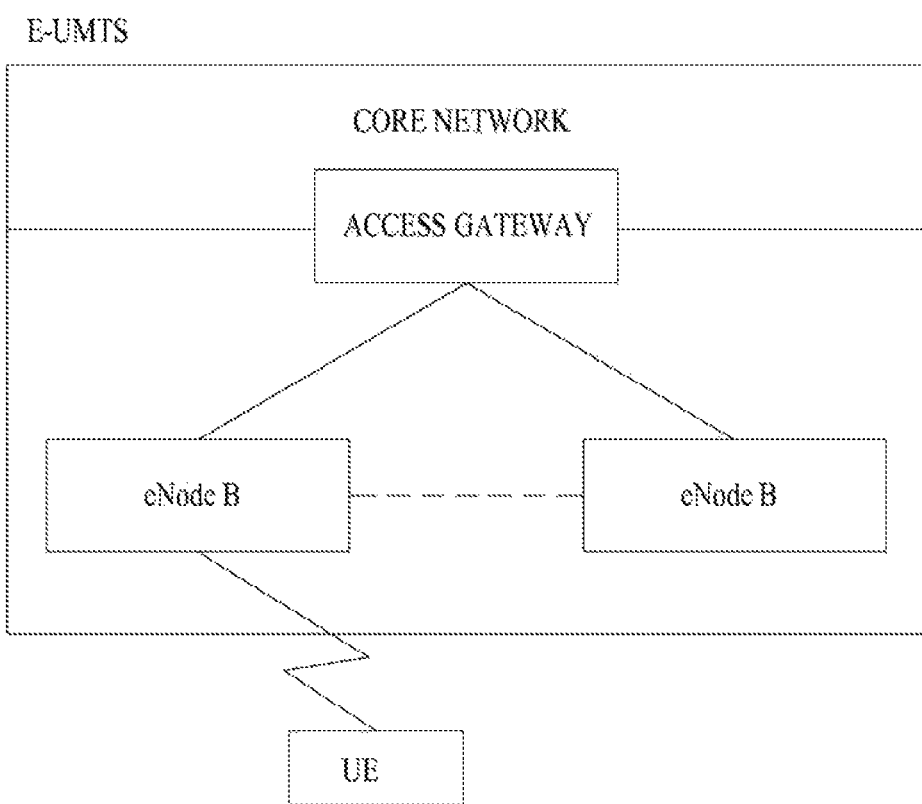
FIG. 1 is a diagram showing a network structure of an Evolved Universal Mobile Telecommunications System (E-UMTS) as an example of a wireless communication system.
Figure 2:
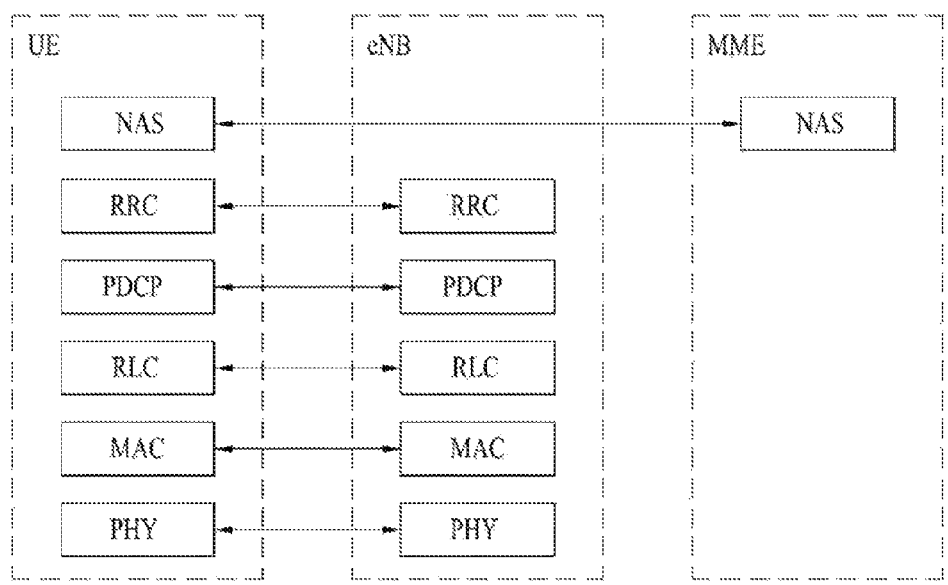
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 2:
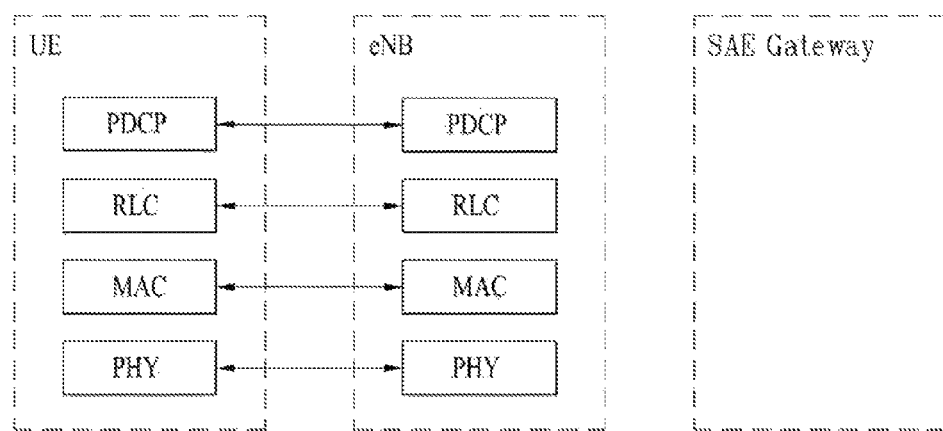

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a HE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
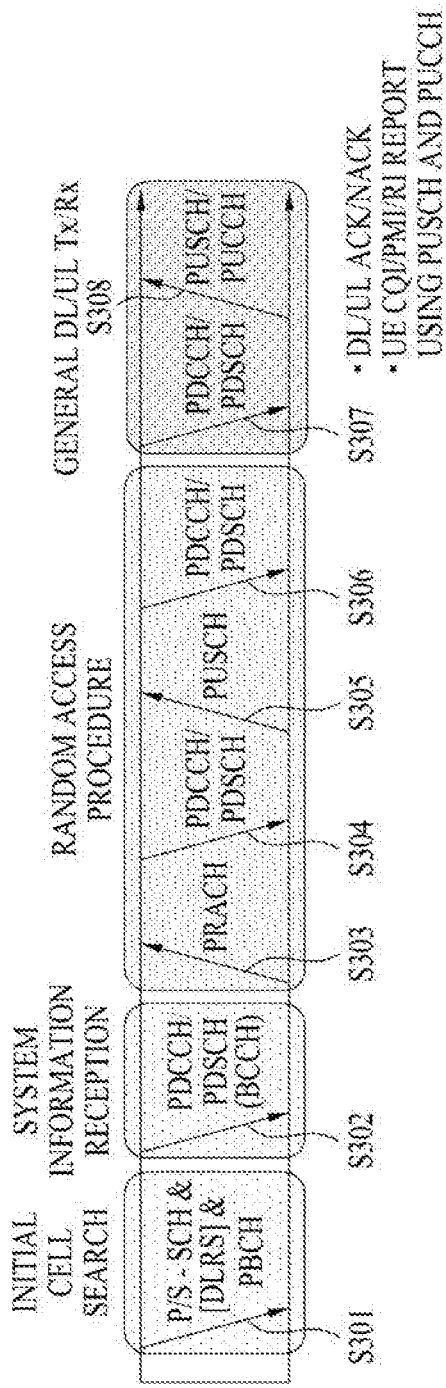
FIG. 3 is a diagram showing physical channels used in a 3GPP system and a general signal transmission method using the same.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
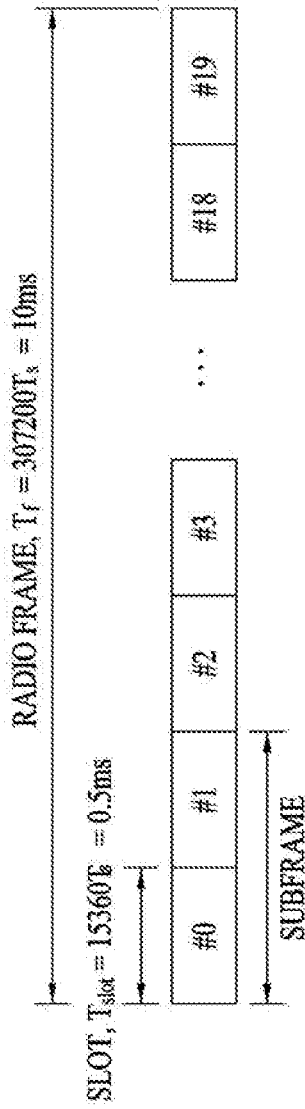
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \text{ 10-8}$ (about 33 ns). Each slot includes a plurality of OFDM symbols in a time domain, and includes a plurality of resource blocks (RBs) in a frequency domain.

In the LTE system, one RB includes 12 subcarriers 7 (6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
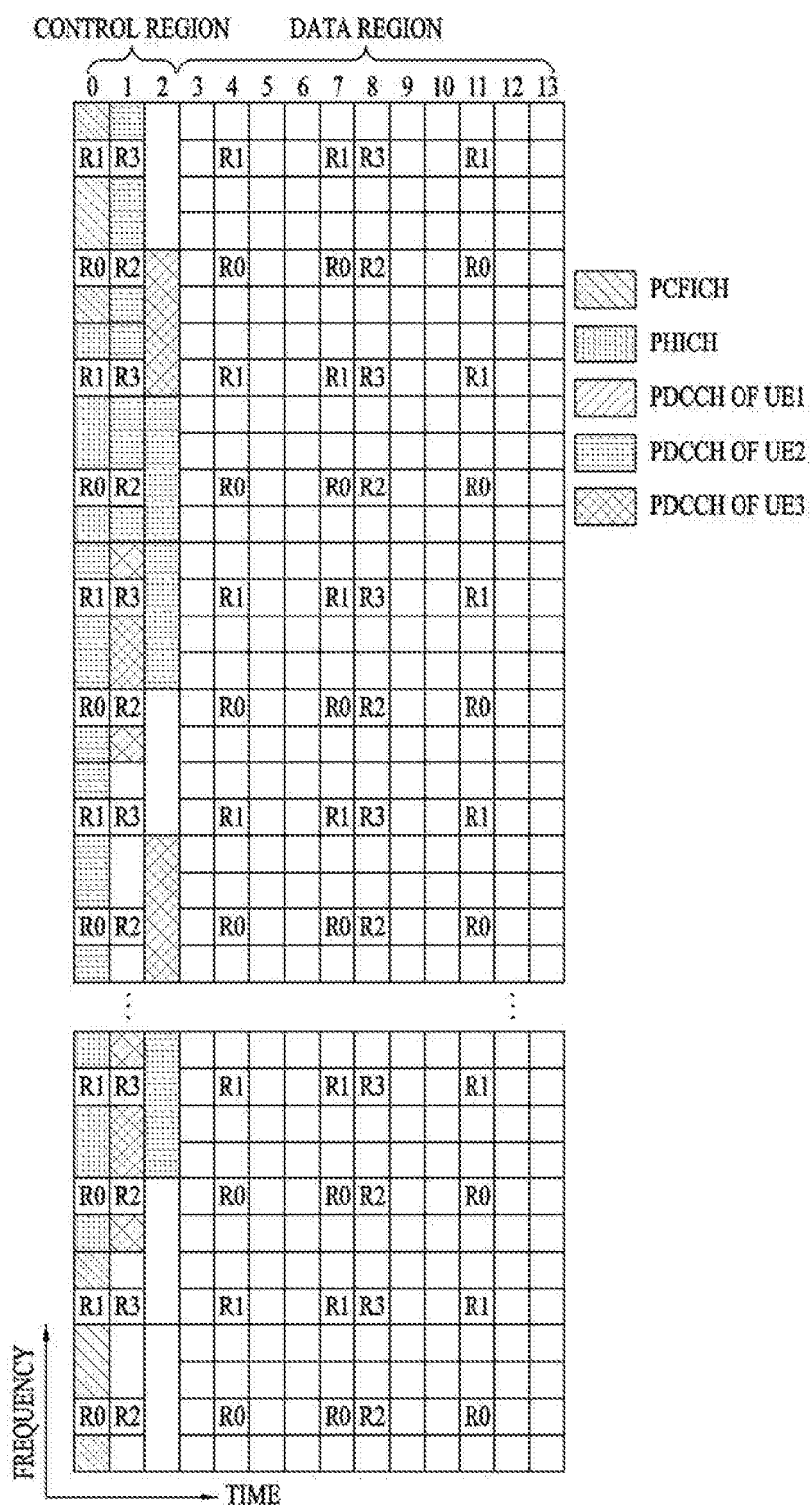
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Recently, it is required to introduce a new control channel to apply a MIMO scheme and an inter-cell cooperative communication scheme. A control channel a newly introduced due to the necessity corresponds to EPDCCH (enhanced PDCCH). The EPDCCH is determined to be assigned to a data region (hereinafter, a PDSCH region) instead of a legacy control region (hereinafter, a PDCCH region). Consequently, it is able to transmit control information on a node according to each terminal through the EPDCCH and it is also able to solve a deficiency problem of the legacy PDCCH region. For reference, the EPDCCH is provided not to a legacy terminal but to an LTE-A terminal only. And, the EPDCCH is transmitted and received based on a DM-RS (or CSI-RS) instead of a CRS corresponding to a legacy cell-specific reference signal.

Figure 6:
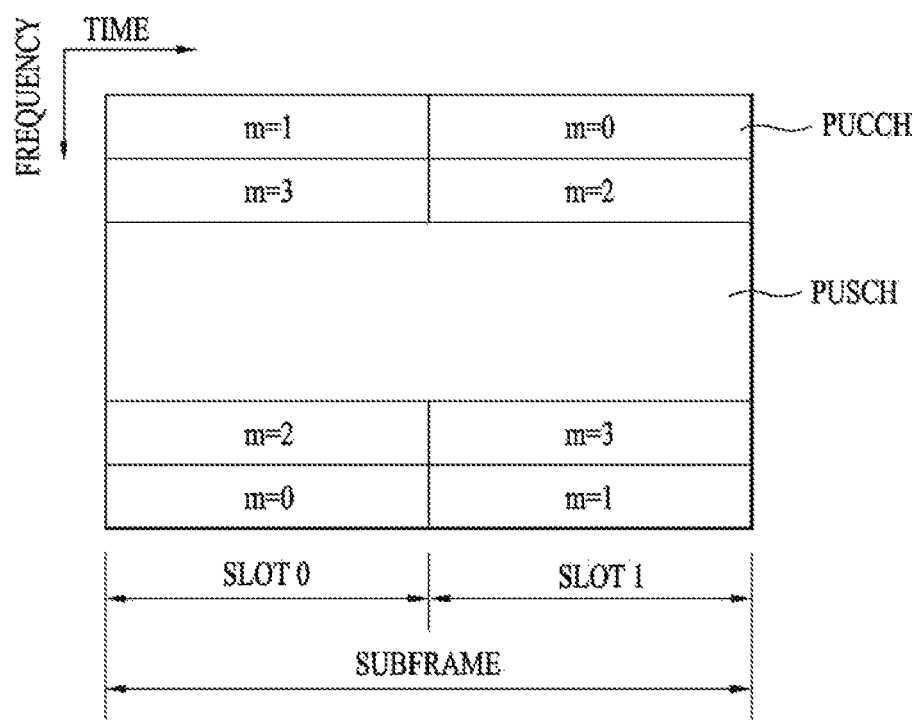
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
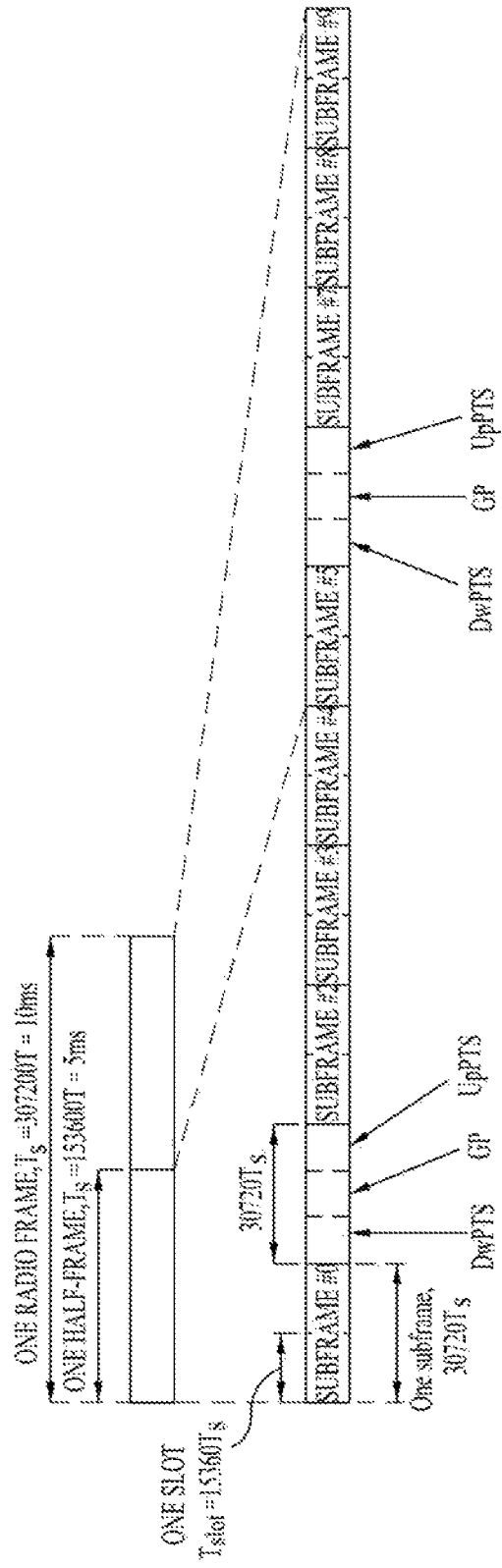
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Currently, as shown in Table 1 in the following, the special subframe is defined by total 10 configurations in LTE TDD system.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in an LTE TDD system, a UL/DL configuration is shown in Table 3 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D indicates a downlink subframe, U indicates an uplink subframe, and S means the special subframe. Also, the above Table 2 represents a downlink-uplink switching period of uplink/downlink subframe configuration in each system.

Figure 8:
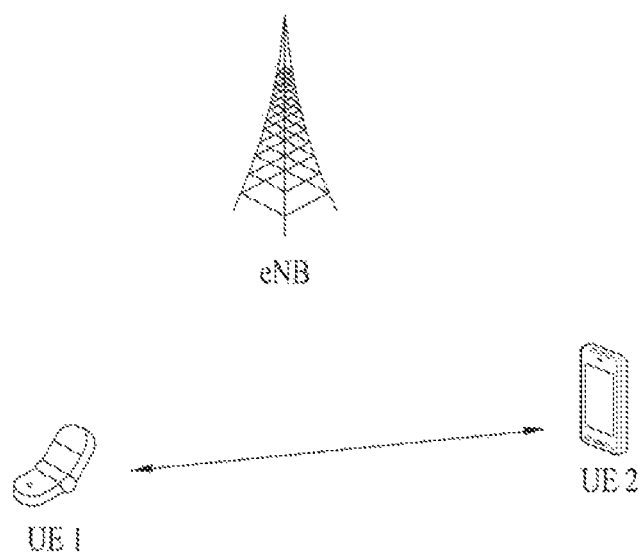
FIG. 8 is a diagram illustrating the concept of device-to-device (D2D) communication.

FIG. 8 is a diagram illustrating the concept of device-to-device (D2D) communication.

Referring to FIG. 8, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs. Hereinafter, a link between UEs is referred to as a D2D link and a link for communication between a UE and an eNB is referred to as an NU link.

In order to perform D2D operation, a UE performs a discovery procedure of determining whether a counterpart UE of D2D communication is located in a D2D communication area. Such a discovery procedure includes transmitting a unique discovery signal for identifying each UE and determining that the UE, which has transmitted the discovery signal, is located at a neighboring position when a neighboring UE detects the discovery signal. That is, each UE determines whether a counterpart UE of D2D communication is located at a neighboring position via the discovery procedure and then performs D2D communication for transmitting and receiving user data.

D2D discovery and D2D communication can be performed between UEs performing communication in a manner of being connected with an eNB in the inside of coverage of the eNB or can be performed between UEs existing without a connection with the eNB at the outside of the coverage of the eNB. In addition, one of UEs connected with a single D2D link may exist in the inside of the coverage of the eNB and another UE may exist at the outside of the coverage of the eNB. In particular, D2D discovery and D2D communication can be performed between the UE existing in the inside of the coverage of the eNB and the UE existing at the outside of the coverage of the eNB.

When the eNB performs a duplex operation in a manner of dividing the total available resources into a downlink resource and an uplink resource, a technology for more flexibly changing an operation of selecting a usage of each resource from a downlink resource and an uplink resource is in progress in a recent wireless communication system.

The aforementioned dynamic resource usage change has a merit in that optimized resource distribution is always available in a situation that a size of downlink traffic and a size of uplink traffic are dynamically changing. For example, while a FDD system is managed in a manner of dividing a frequency band into a downlink band and an uplink band, an eNB can designate a specific band as a downlink band or an uplink band at specific timing through RRC, MAC layer or a physical layer signal for the dynamic resource usage change.

In particular, a TDD system divides the total subframes into an uplink subframe and a downlink subframe and uses the uplink subframe and the downlink subframe for uplink transmission of a UE and downlink transmission of an eNB, respectively. In general, the resource division can be given as a part of system information according to uplink/downlink subframe configurations mentioned earlier in Table 1. Of course, it is able to additionally provide a new uplink/downlink subframe configuration as well as the uplink/downlink subframe configurations shown in Table 1. In order to perform the dynamic resource usage change in TDD system, an eNB can designate a specific subframe as a downlink resource or an uplink resource at specific timing through RRC, MAC layer or a physical layer signal.

In a legacy LTE system, a downlink resource and an uplink resource are designated via system information. In this case, since the system information corresponds to information transmitted to a plurality of unspecified UEs, if the system information is dynamically changed, it may cause a problem for operations of legacy UEs. Hence, it may be preferable to deliver information on the dynamic resource usage change to UEs via new signaling, i.e., UE-specific signaling, instead of the system information. The new signaling may indicate uplink/downlink subframe configuration information different from a configuration of a dynamically changed resource, e.g., a configuration indicated in the system information of a TDD system.

The present invention proposes a method of efficiently managing an uplink resource based on the aforementioned explanation. In this case, the uplink resource may correspond to an uplink band in a FDD system and an uplink subframe in a TDD system.

In a legacy wireless communication system, a user equipment uses an uplink resource to transmit a signal to a base station. Yet, according to a newly appearing advanced communication scheme, a method of maximizing effectiveness of a resource usage is under discussion by utilizing the uplink resource with a different usage. As an example, if a base station has huge amount of data to be transmitted to a user equipment, the base station transmits the data to the user equipment using a partial time/frequency of an uplink resource, thereby reducing latency of data transmission. As a different example, when the aforementioned direct communication between UEs is performed, it may also be able to use an uplink resource. In both cases, there is a common point that a user equipment receives a specific signal through an uplink resource.

As mentioned in the foregoing description, if a user equipment uses an uplink resource for a usage different from a legacy usage, it is necessary for a base station to manage the total uplink resources in a manner of dividing the uplink resources for a case that a legacy user equipment and a user equipment on which a new technology is mounted coexist. In particular, a user equipment uses a part of uplink resources for a usage of transmitting a signal to a base station corresponding to a legacy operation and uses the rest of the uplink resources for the aforementioned additional usage. In general, since it is difficult for a user equipment to transmit and receive a signal at the same time at specific timing, it is preferable to separate the resources of the two usages from each other in time dimension. In particular, a partial subframe is utilized for the legacy usage and the rest of subframes are used for the additional usage. Preferably, a base station can inform a user equipment of a subframe in which communication of the additional usage is performed in advance via system information, a higher layer signal such as RRC signaling or a physical layer signal.

In most cases, it is preferable to indicate information on a subframe used for the aforementioned additional usage using the limited number of bits to reduce excessive overhead. For example, a pattern of repeating the subframe used for the additional usage is defined in advance and it may be able to signal whether or not the subframe repetition pattern is currently used using the limited number of bits. Yet, in some cases, it may be very difficult to design the signaling for avoiding all patterns in which subframes used for the legacy usage appear. For example, when a subframe used for the additional usage among 10 contiguous subframes appearing in every interval is signaled using 10 bits and a signal for interval information, if an interval of appearing a subframe used for the legacy usage is not matched with an interval of appearing the subframe used for the additional usage, it is impossible to avoid a collision between the two subframe usages using the 10 bits.

In order to solve the aforementioned problem, a base station preferentially delivers information on the subframe mandatorily used for the legacy usage to a user equipment. Subsequently, if the user equipment obtains location information of a subframe used for the additional usage through additional signaling but the subframe should be used as a subframe used for the legacy usage, the user equipment gives priority to the subframe to be used as the legacy usage and the user equipment is able to recognize the subframe as a subframe incapable of being used as the additional usage. In this case, the information on the subframe mandatorily used for the legacy usage delivered to the user equipment may correspond to information previously obtained via system information in a process that the user equipment accesses the base station.

More specifically, "the subframe mandatorily used for the legacy usage" may correspond to a subframe configured to transmit a PRACH (physical random access channel) used for initial access or a subframe included in a cell-specific SRS configuration designated to transmit a periodic/non-periodic SRS in a cell. The two types of subframes have a common point in that a base station does not have a method of dynamically controlling an operation of a legacy user equipment receiving a signal from the base station. Hence, if the subframes are used for the additional usage, interference may occur between a signal transmitted by the legacy user equipment and a signal used for the additional usage.

When the aforementioned discussion is applied to an operation of a base station transmitting data to a user equipment through an uplink resource, although a usage of a specific uplink subframe #n is designated as a subframe capable of transmitting a signal to the user equipment by the base station, if the subframe #n belongs to a PRACH configuration or a cell-specific SRS configuration, the user equipment assumes that there is no data transmission from the base station and does not perform any appropriate operation. For example, the user equipment does not detect any downlink control channel or does not measure channel state information.

When the aforementioned discussion is applied to an operation that the user equipment directly transmits and receives a signal through an uplink resource, although a usage of a specific uplink subframe #n is designated as a subframe capable of performing direct communication between user equipments, if the subframe #n belongs to a PRACH configuration or a cell-specific SRS configuration, the user equipment does not transmit a D2D communication signal in the subframe #n or omits an operation of receiving a D2D communication signal from a different user equipment. In particular, when a user equipment stochastically selects a part of resources configured by a base station and transmits a prescribed signal (e.g., a discovery signal transmitted to make an adjacent different user equipment discover the user equipment) to a different user equipment, a subframe mandatorily used for the legacy usage may have a form that the probabilistic signal transmission is prohibited. In a different meaning, a user equipment can assume that a subframe is not utilized for the additional usage in uplink resource information mandatorily used for the legacy usage.

Meanwhile, uplink resource information (i.e., resource information incapable of being used as an additional usage) mandatorily used for a legacy usage can be transmitted to a user equipment through a separate signal. Specifically, the separate signal may have a union form of subframe patterns represented by a plurality of intervals and subframe offsets to indicate a plurality of subframes used for the legacy usage.

In addition, although a legacy usage and an additional usage are collided with each other in a subframe, the subframe can be used for both the legacy usage and the additional usage in a manner of separating frequency resources from each other. In particular, in case of a PRACH, since a legacy user equipment can transmit a PRACH preamble using a limited frequency resource only and all user equipments are able to identify a position of a frequency resource capable of transmitting the PRACH, it is able to utilize the aforementioned additional usage, in particular, a usage of transmitting and receiving a direct signal between user equipments in a frequency resource except the frequency resource capable of transmitting the PRACH. In a different meaning, although transmission and reception of a direct signal between user equipments is prohibited in the frequency resource capable of transmitting the PRACH, transmission and reception of the direct signal between user equipments is permitted in a different frequency resource in an identical subframe.

As a result, if a size of a frequency resource capable of being used as the additional usage is reduced, a user equipment can change an operation of the user equipment according to the reduction of the size of the frequency resource. For example, assume that a user equipment determines whether to perform transmission according to a probability P in each subframe and directly transmits a signal to a different user equipment in a manner of stochastically selecting a part of designated resources base on the decision. In this case, if M numbers of resources are selectable only in a subframe although N numbers of resources are capable of being selected in the subframe in general, it is able to constantly maintain a probability of transmitting a signal transmitted by the user equipment in a single resource in a manner of changing the probability P into such a form as P*M/N. Of course, it may also be able to change a probability of a different form determined by the M, the N and the P.

In some cases, it is necessary for a user equipment to transceive a signal with a base station and a user equipment of a neighbor cell. In this case, it is necessary for the neighbor cell to obtain information on a position of a resource utilizing uplink as an additional usage. The information can be delivered by a serving base station to which the user equipment is accessing. In this case, a concept of the present invention can be identically applied. In particular, a neighbor base station can transmit uplink resource information mandatorily used for a legacy usage (i.e., resource information incapable of being used for an additional usage) to the user equipment while the neighbor base station signals location information of a resource used for an additional usage.

Figure 9:
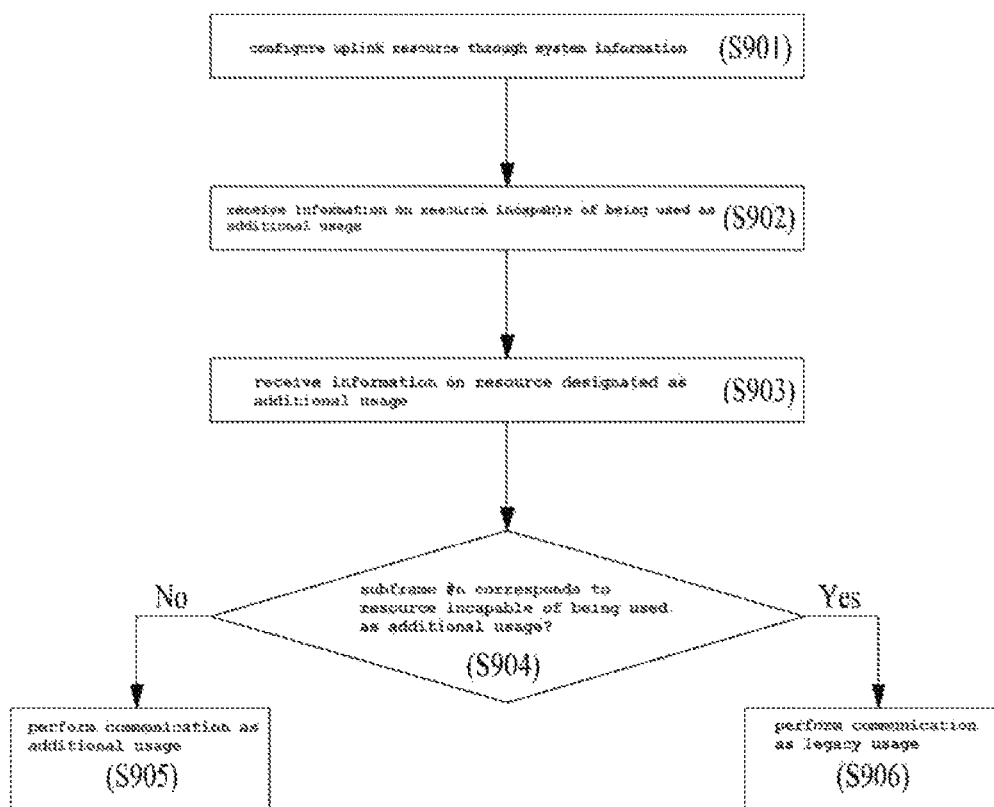
FIG. 9 is a flowchart for a method of managing an uplink resource according to embodiments of the present invention.

FIG. 9 is a flowchart for a method of managing an uplink resource according to embodiments of the present invention. For clarity, assume a case that a direct communication is performed between user equipments in FIG. 9.

Referring to FIG. 9, in the step S901, a user equipment receives information of a basic uplink resource. In the step S902, the user equipment can receive resource information incapable of being used as an additional usage. In this case, the resource information incapable of being used as the additional usage may be signaled by such a form as a PRACH configuration and a cell-specific SRS configuration.

Subsequently, in the step S903, the user equipment can receive resource location information used for an additional usage, i.e., a usage of direct communication between user equipments, through higher layer signaling or a downlink physical control channel.

Subsequently, in the step S904, the user equipment determines whether or not an uplink resource (e.g., a subframe #n), which is designated as a resource capable of performing direct communication between user equipments, corresponds to the resource incapable of being used for the additional usage received in the step S902. If the uplink resource is not the resource incapable of being used for the additional usage, the user equipment performs direct communication between the user equipments in the step S905. If the uplink resource corresponds to the resource incapable of being used for the additional usage, the user equipment performs a legacy usage, i.e., transmits a PRACH or a cell-specific SRS in the step S906.

Figure 10:
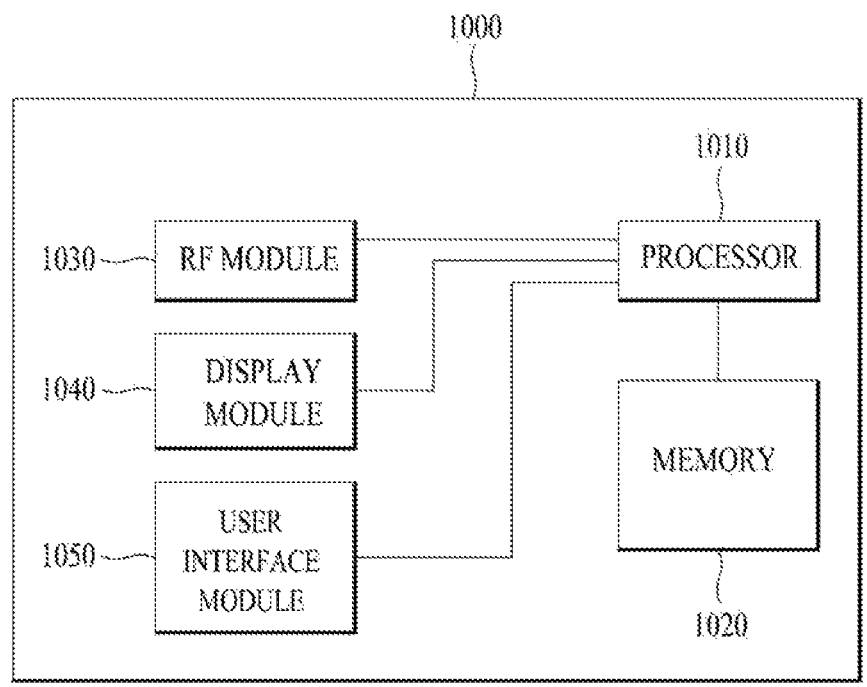
FIG. 10 is a block diagram of a communication apparatus according to an embodiment of the present invention.

FIG. 10 is a block diagram illustrating a communication device according to embodiments of the present invention.

In FIG. 10, the communication device 1000 includes a processor 1010, a memory 1020, a Radio Frequency (RF) module 1030, a display module 1040, and a user interface (UI) module 1050.

The communication device 1000 is disclosed for illustrative purposes only and certain modules may also be omitted from the communication device 1000 as necessary. In addition, the communication device 1000 may further include necessary modules. Some modules of the communication device 1000 may be identified as more detailed modules. The processor 1010 is configured to carry out the operations of the embodiments of the present invention. For detailed operations of the processor 1010 reference may be made to FIGS. 1 to 9.

The memory 1020 is connected to the processor 1010, and stores an operating system, applications, program code, data and the like. The RF module 1030 is connected to the processor 1010 and converts a baseband signal into a radio frequency (RF) signal, or converts the RF signal into the baseband signal. For these operations, the RF module 1030 performs analog conversion, amplification, filtering, and frequency up-conversion in order or performs such operations in reverse order. The display module 1040 is connected to the processor 1010 and displays a variety of information. The scope or spirit of the display module 1040 of the present invention is not limited thereto, and the display module 1040 may be any of well-known elements, for example, a Liquid Crystal Display (LCD), a Light Emitting Diode (LED), an Organic Light Emitting Diode (OLED) and the like. The user interface (UI) module 1050 is connected to the processor 1010, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although a method of managing an uplink transmission resource in a wireless communication system and an apparatus therefor are described with reference to examples applied to 3GPP LTE system, it may be applicable to various kinds of wireless communication systems as well as the 3GPP LTE system.

What is claimed is:

1. A method for transmitting a device-to-device (D2D) signal for a D2D link at a user equipment (UE) in a wireless communication system, the method comprising:
    determining whether or not to transmit the D2D signal in a certain time interval using an uplink resource pool assigned for the D2D link to the UE based on a first probability,
    wherein any uplink resource overlapping with resources for a physical random access channel (PRACH) is excluded from the uplink resource pool; and
    when it is determined to transmit the D2D signal, selecting a resource randomly from the uplink resource pool based on a second probability applied to the uplink resource pool, and transmitting the D2D signal using the selected resource to a target UE in the certain time interval.

2. The method according to claim 1, wherein the first probability is modified based on a number of the resources for the PRACH.

3. The method according to claim 1, further comprising:
    receiving information on the uplink resource pool from a base station (BS).

4. The method according to claim 1, further comprising:
receiving information on the resources for the PRACH from a base station (BS).

5. The method according to claim 1, wherein:
when the wireless communication system is a frequency division duplex (FDD) system, the uplink resource pool comprises uplink frequency bands, and
when the wireless communication system is a time division duplex (TDD) system, the uplink resource pool comprises uplink subframes.

6. The method according to claim 1, wherein the certain time interval corresponds to one subframe.

7. The method according to claim 1, wherein the first probability and the second probability are independent of each other.

8. A user equipment (UE) in a wireless communication system, the UE comprising:
a transceiver configured to transmit signals to a base station (BS) via a downlink and receive signals from the BS via an uplink, or transmit signals to a target UE and receive signals from the target UE via a device-to-device (D2D) link; and
a processor configured to:
process the signals, and
determine whether or not to control the transceiver to transmit a D2D signal in a certain time interval using an uplink resource pool assigned for the D2D link to the UE based on a first probability,
wherein any uplink resource overlapping with resources for a physical random access channel (PRACH) is excluded from the uplink resource pool, and
wherein when it is determined to transmit the D2D signal, the processor selects a resource randomly from the uplink resource pool based on a second probability applied to the uplink resource pool, and controls the transceiver to transmit the D2D signal using the selected resource to the target UE in the certain time interval.

9. The UE according to claim 8, wherein the first probability is modified based on a number of the resources for the PRACH.

10. The UE according to claim 8, wherein the processor controls the transceiver to receive information on the uplink resource pool from the BS.

11. The UE according to claim 8, wherein the processor controls the transceiver to receive information on the resources for the PRACH from the BS.

12. The UE according to claim 8, wherein:
when the wireless communication system is a frequency division duplex (FDD) system, the uplink resource pool comprises uplink frequency bands, and
when the wireless communication system is a time division duplex (TDD) system, the uplink resource pool comprises uplink subframes.

13. The UE according to claim 8, wherein the certain time interval corresponds to one subframe.

14. The UE according to claim 8, wherein the first probability and the second probability are independent of each other.

* * * * *